United States Patent
Mori et al.

(10) Patent No.: US 7,313,317 B2
(45) Date of Patent: Dec. 25, 2007

(54) PORTABLE IMAGE RECORDING APPARATUS

(75) Inventors: Masashi Mori, Tokyo (JP); Kunio Nakaoka, Tokyo (JP); Hiroaki Sakai, Tokyo (JP); Yoshinari Sugegaya, Tokyo (JP); Akihiko Naito, Tokyo (JP); Masaki Yamakawa, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 1397 days.

(21) Appl. No.: 10/014,351

(22) Filed: Dec. 14, 2001

(65) Prior Publication Data

US 2003/0012560 A1    Jan. 16, 2003

(30) Foreign Application Priority Data

Jul. 12, 2001  (JP)  ............................. 2001-212649

(51) Int. Cl.
*H04N 7/26* (2006.01)
*H04N 5/00* (2006.01)

(52) U.S. Cl. ...................................... 386/109; 386/125

(58) Field of Classification Search ................ 386/109, 386/111, 112, 124, 125, 65, 27, 33, 46, 1
See application file for complete search history.

(56) References Cited

U.S. PATENT DOCUMENTS 5,377,051 A * 12/1994 Lane et al. .................... 386/81
6,567,117 B1 * 5/2003 Nago et al. ................. 348/180
2005/0094870 A1 * 5/2005 Furukawa et al. .......... 382/155

FOREIGN PATENT DOCUMENTS

JP  HEI 6-251080  9/1994
JP  2000-59774  2/2000

* cited by examiner

*Primary Examiner*—Robert Chevalier
(74) *Attorney, Agent, or Firm*—Buchanan Ingersoll & Rooney PC

(57) ABSTRACT

The portable image recording apparatus comprises a coding unit which codes an input sound and image data relating to an image, a parameter setting unit which variably sets a frame rate and a bit rate of coding to be executed by the coding unit according to a type of contents of the image; and a recording unit which records the coded data obtained by the coding unit into a small-sized recording medium.

7 Claims, 5 Drawing Sheets

| IMAGE SIZE (inch) | 1.5~2 | 2~2.5 | 2.5~3 |
|---|---|---|---|
| IMAGE RESOLUTION | SQVGA~QCIF | QCIF~HQVGA | HQVGA~CIF |
| FRAME RATE (fps) | 8~15 | 10~15 | 10~20 |
| BIT RATE (kbps) | 32~128 | 64~256 | 128~512 |

| TYPE OF CONTENTS | NEWS | BASEBALL BROADCASTING | DRAMA |
|---|---|---|---|
| IMAGE SIZE | 2.0-inch | 3.0-inch | 2.5-inch |
| IMAGE RESOLUTION | QCIF | CIF | CIF |
| OPTIMAL FRAME RATE RANGE | 5-10 (fps) | 13-15 (fps) | 10-12 (fps) |
| OPTIMAL FRAME IMAGE QUALITY RANGE | 30-35 (dB) | 30-32 (dB) | 32-35 (dB) |

PORTABLE IMAGE RECORDING APPARATUS

FIELD OF THE INVENTION

The present invention relates to a portable image recording apparatus having a function for recording sound and image information. Especially, this invention relates to the portable image recording apparatus which controls certain coding parameter(s) that influence a reproduction quality of an image to obtain an image having a reproduction quality.

BACKGROUND OF THE INVENTION

Examples of devices which digitally recording and reproducing images and/or sound are the digital video cameras and the portable DVD players. These devices use a digital video cassette (DV tape cassette), a digital video disk (DVD) or the like as a recording medium. However, since these devices require a high bit rate, a duration for which recording can be performed ("recording time") or a duration for which reproduction can be performed ("reproduction time") is shorter although these devices have a large size.

Various portable terminal type digital recording/reproduction apparatuses that overcome the above mentioned problem by using an efficient memory than the conventional recording media have been suggested. These apparatuses receive and code a video input and a sound input and record them into the memory card such as a multimedia card (MMC) that utilizes a flash memory, a Smart Media (Trademark), or a SD (Secure Density) card as a recording medium, and decode the recorded data and reproduce them. Moreover, recently a portable terminal type digital recording/reproduction apparatus using a very small sized and low-capacity magneto-optical disk as a recording medium have also been suggested. This magneto-optical disk has a capacity of between 500 MB and 2 GB, and a size between 2 inches to less than or equal to 3 cm. In this magneto-optical disk, recording can be carried out with a lower bit rate than the above-mentioned conventional recording media, and as a result the recording time can be made longer.

However, in the conventional portable digital recording/reproduction apparatus, when a dynamic image or sound is coded, mostly a frame rate or a bit rate is always constant regardless of a type of dynamic image contents and image size. Therefore, the conventional portable digital recording/reproduction apparatus has problems, depending on the type of the dynamic image content (for example, news, drama), such that the quality of the reproduction is unsatisfactory, the dynamic image does not move sufficiently due to a low frame rate, and the recording time becomes short because the bit rate is made unnecessarily high. Problems similar to those mentioned above arise when the frame rate or the bit rate are not adjusted suitably according to differences in a screen size (in inch) and an image resolution (i.e. size of the dynamic image).

SUMMARY OF THE INVENTION

It is an object of the present invention to provide a portable image recording apparatus which always produces a dynamic image with optimal image quality to a user and which can efficiently record a dynamic image or sound data onto a small sized recording medium.

The portable image recording apparatus according to one aspect of the invention is for coding input sound and image data relating to an image and, recording the coded data in a small-sized recording medium. This portable image recording apparatus comprises: a coding unit which codes the input sound and image data; and a parameter setting unit which variably sets a frame rate and a bit rate of coding to be executed by the coding unit according to a type of contents of the image. Thus, the frame rate and the bit rate can be adjusted depending upon whether the image is related to, for example, news, baseball broadcasting and drama.

The portable image recording apparatus according to another aspect of the invention is for coding input sound and image data relating to an image, and recording the coded data in a small-sized recording medium. This portable image recording apparatus comprises: a coding unit which codes the input sound and image data; and a parameter setting unit which variably sets a frame rate and a bit rate of coding to be executed by the coding unit according to a size of the image. Thus, the frame rate and the bit rate can be adjusted depending upon depending on the size of the image.

The portable image recording apparatus according to still another aspect of the invention is for coding input sound and image data relating to an image, and recording the coded data in a small-sized recording medium. This portable image recording apparatus comprises: a coding unit which codes the input sound and image data; and a parameter setting unit which variably sets a frame rate and a bit rate of coding to be executed by the coding unit according to a resolution of the image. Thus, the frame rate and the bit rate can be adjusted depending upon depending on the resolution, such as QCIF, SQVGA and HQVGA, of the image.

The portable image recording apparatus according to still another aspect of the invention is for coding input sound and image data relating to an image, and recording the coded data in a small-sized recording medium. This portable image recording apparatus comprises: a coding unit which codes the input sound and image data; and a parameter setting unit which variably sets a frame rate or an image quality of a frame ("frame image quality") of coding to be executed by the coding unit within a predetermined range of the frame rate or a predetermined range of the image quality of the frame respectively so that a current bit rate maintains a target bit rate during the coding. Thus, during the coding the frame rate or the frame image quality of coding can be adjusted within the predetermined ranges of the frame rate or the frame image quality respectively so that the current bit rate is same as the target bit rate.

The portable image recording apparatus according to still another aspect of the invention is for coding input sound and image data relating to an image, and recording the coded data in a small-sized recording medium. This portable image recording apparatus comprises: a coding unit which codes the input sound and image data; a database which previously stores therein optimal ranges of a frame rate, a bit rate, and a frame image quality of coding to be executed by the coding unit according to a type, a size, and a resolution of the image; a first parameter setting unit which selects a frame rate and a bit rate which are optimal for a selected image type, an image size, and an image resolution based on the contents of the database and setting the selected frame rate and the bit rate in the coding unit as initial values; and a second parameter setting unit which variably sets a frame rate or an image quality of a frame of coding to be executed by the coding unit within a predetermined range of the frame rate and a predetermined range of the frame image quality respectively so that a current bit rate maintains a target bit rate during coding. Thus, a general frame rate and a bit rate at the time of coding are set by the first parameter setting unit within the optimal ranges according to the selected type, size, and resolution of the image. The frame rate or the frame image quality is dynamically fluctuated at that time of coding by the second parameter setting unit so that the whole bit rate is kept constant.

Other objects and features of this invention will become apparent from the following description with reference to the accompanying drawings.

DESCRIPTION OF THE PREFERRED EMBODIMENTS

An embodiment of a portable image recording apparatus according to the present invention will be explained below with reference to the accompanying diagrams.

Figure 1:
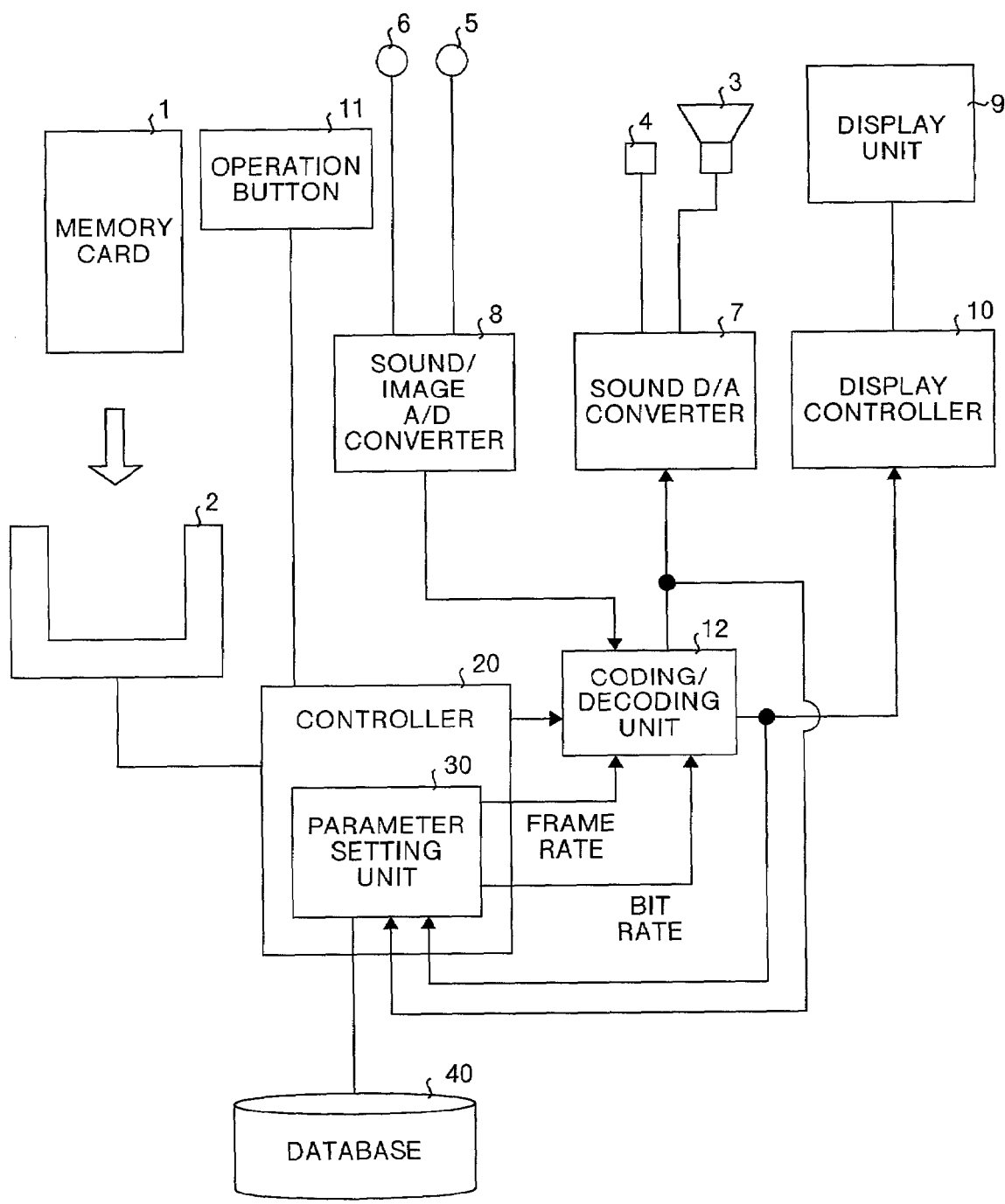
FIG. 1 is a block diagram showing a structure of a portable image recording apparatus according to an embodiment of the present invention.

FIG. 1 is a block diagram showing an example of a structural of a portable video player. This portable video player is an example of the portable image recording apparatus according to the embodiment of the present invention. A memory card is taken here as an example of a small-sized recording medium. The portable video player shown in FIG. 1 comprises a connector 2 for connecting a memory card 1 as and when desired. The memory card 1 comprises a flash memory such as a multimedia (MMC) card, a Smart Media (Trademark) or an SD (secure density) card. The connector 2 comprises a plurality of contact terminals housed in a housing ("connector housing"), and the plural contact terminals are brought into contact with a plurality of contact pads formed on front or rear surface of the memory card 1 that is to be attached. By doing so, the memory card 1 is electrically connected to the portable video player via the connector 2.

The portable video player is capable of recording/reproducing an image or a sound. The portable video player includes the connector 2, a speaker 3, a sound external output terminal 4, an image input terminal 5, a sound input terminal 6, a sound D/A converter 7, a sound/image A/D converter 8, a display unit 9 such as a liquid crystal display, a display controller 10, a coding/decoding unit 12, a controller 20, a parameter setting unit 30, and a database 40.

The contents stored in the database 40 will now be described. The contents in the database are stored, for example, referring to a monitoring result of a user.

Namely, inspection is made as to which value in a range is suitable for various parameters at the time of coding in each of various combinations of types of dynamic image contents (news, sports broadcasting, drama, etc.) and display screen sizes. As parameters at the time of coding, there are a bit rate, a frame rate, switching between motion preference/inter-frame image quality preference, and a coding image size (a number of lines×a number of pixels). Referring to this monitoring result, suitable parameter ranges are specified for the respective contents and display screen sizes so that a database is created.

Two types of parameter ranges should be determined.

(a) One of them is an optimal parameter range of the frame rate and the bit rate as an average.

(b) The other one is a parameter range (optimal frame image quality range) for dynamically setting a frame rate to inter-frame image quality in an image sequence at the time of coding in order to keep the whole bit rate.

Firstly there will be explained below a method of determining the former (a) parameter range. Images having a comparatively lot of movements are prepared for the combinations of the various display image sizes (1.5 inches, 2 inches, . . . , 3 inches, etc.) and image resolutions (SQVGA (160×120), QCIF (174×144), HQVGA (240×176), CIF (352×288), etc.). In the case of images having small movements, high image quality can be obtained with the uniform bit rate and frame rate in comparison with images having active movements. For this reason, an evaluation for images having a lot of movements is sufficient.

Figures 2, 3, 4:
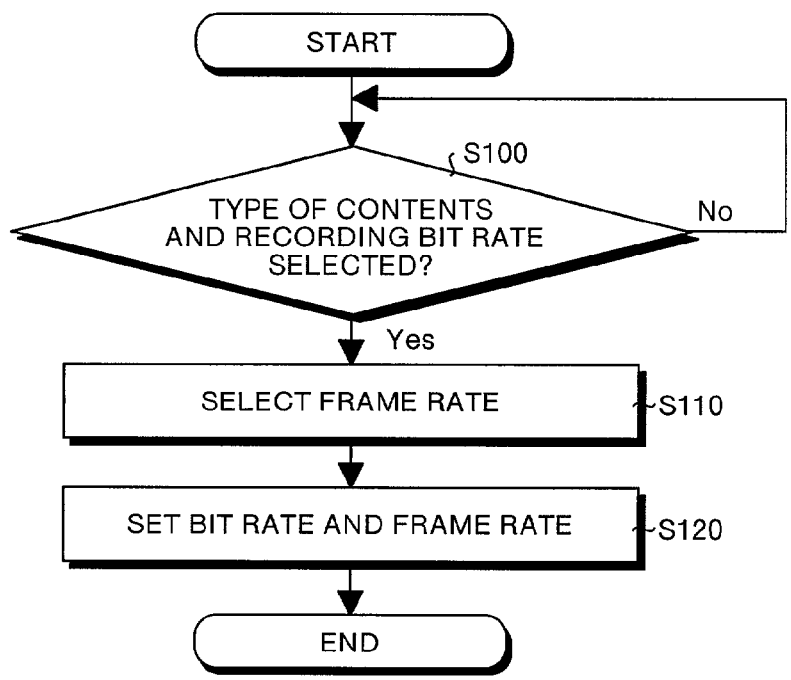
FIG. 2 is a diagram showing one example of contents stored in a database.
FIG. 3 is a diagram showing an another example of contents stored in a database.
FIG. 4 is a flowchart showing a procedure for setting initial values ("initial setting operation") of a bit rate and a frame rate.

Several types of dynamic images having a lot of movements (sports broadcasting, movie, drama) are prepared, the plural dynamic images are coded with the combinations of various bit rates and frame rates. As a coding system, for example, MPEG-4 is used. The plural coded dynamic images are decoded and are displayed as images with the combinations of the various display image sizes and image resolutions, and a number of examiner are asked to decide which image is good ("monitoring"). The optimal frame rate ranges and bit rate ranges are obtained for each of the plural image sizes and image resolutions based on the monitoring results. FIG. 2 shows a table entry relating to the optimal frame rate ranges and bit rate ranges obtained in such a manner, and such a data table is stored in the database 40.

As shown in FIG. 2, when the image size is 1.5 to 2 inches, the optimal image resolution is SQVGA to QCIF, the optimal frame rate range is 8 to 15 fps, and the optimal bit rate is 32 to 128 Kbps. Moreover, when the image size is 2 to 2.5 inches, the optimal image resolution is QCIF to HQVGA, the optimal frame rate range is 10 to 15 fps, and the optimal bit rate is 64 to 256 Kbps. Furthermore, when the image size is 2.5 to 3 inches, the optimal image resolution is HQVGA to CIF, the optimal frame rate range is 10 to 20 fps, and the optimal bit rate is 128 to 512 Kbps.

An initial value and an average value of the parameter setting at that time of coding are set according to the set contents of the data table shown in FIG. 2.

Next, there will be explained below a method of determining the latter (b) parameter range. A lot of sample dynamic images, in which various image contents (news, baseball broadcasting, drama, etc.), various image sizes and various image resolutions are combined, are prepared. The respective sample dynamic image sequences are divided into portions with a lot of movements, portions with a small number of movements, and portions with middle-level movements. The divided dynamic image sequences are processed by the following procedure so that the parameter range is determined.

(1) As for the divided sequence with a lot of movements and the divided sequence with middle-level movements, an image in which the frame rate is improved and the inter-frame image quality is lowered, and on the contrary an image in which the frame rate is lowered and the inter-frame image quality is improved, and a moderate image between the above two images are created within a predetermined bit rate range. As for the sequence with small movements, a compressing rate is controlled within a predetermined bit rate so that the inter-frame image quality is improved as much as possible.

(2) The divided sequences are combined again so as to be reconstructed into the original dynamic image sequence. As for the divided sequences of the portions with a lot of movements and small movements, since the plural divided sequences are created by the process (1), a plurality of dynamic image sequences are restored for one sample dynamic image.

(3) As for the respective sample dynamic images, the user monitoring is carried out for a lot of users as to which dynamic image sequence is visually suitable.

(4) The monitoring result is analyzed, and a determination is made as to what selection should be made for the divided sequence with a lot of movements and the divided sequence with middle-level movements. In general, the parameters (frame rate, inter-frame image quality) has a tendency that when one of the parameters is improved, the other one is lowered.

(5) The optimal frame rate range and the optimal frame image quality range are obtained for each of the types of contents, image sizes and image resolutions based on the analyzed result of the monitoring result. FIG. 3 shows one part of the table entry relating to the optimal frame rate ranges and the optimal frame image quality ranges obtained in such a manner. Such a data table is set and stored in the database 40.

As shown in FIG. 3, for example, when a type of the contents is news, the image size is 2.0 inches and the image resolution is QCIF, the optimal frame range is 5 to 10 fps, and the optimal frame image quality range is 30 to 35 db. When a type of the contents is baseball broadcasting, the image size is 3.0 inches and the image resolution is CIF, the optimal frame range is 13 to 15 fps, and the optimal frame image quality range is 30 to 32 db. When a type of the contents is drama, the image size is 2.5 inches and the image resolution is CIF, the optimal frame range is 10 to 12 fps, and the optimal frame image quality range is 32 to 35 db.

In the parameter setting unit 30 of the controller 20 shown in FIG. 1, at the time of recording the dynamic image contents, the coding/decoding unit 12 is set so that the above-mentioned various parameters are realized and carries out coding based on the contents to be recorded and the display screen size. The coded dynamic sound information is written into the memory card 1.

At the time of reproducing the dynamic image contents, the dynamic image sound coded information in the memory card 1 is read and decoded. The sound is converted from a digital state into an analog state so as to be output to the speaker 3. The dynamic image is converted from a digital state into an analog state so as to be output to the display unit 9.

An operational at the time of recording by the portable video player will be explained with reference to the flow-charts shown in FIG. 4 to FIG. 7.

FIG. 4 shows an operation for setting the initial values of the coding parameters. This operation is carried out at the time of recording. A user selects and specifies a type of image contents and the recording bit rate via the operation button 11 (step S100). When the type of the image contents and the recording bit rate are selected and specified, the parameter setting unit 30 of the controller 20 sets the selected recording bit rate to a target bit rate and selects a frame rate according to the target bit rate, the display screen size of the portable video player and the image resolution of the portable video player within a range which satisfies the conditions of the data table shown in FIG. 2 set in the database 40 (step S110). When the recording bit rate selected by the user does not fall within the range which satisfies the conditions of the data table shown in FIG. 2, the parameter setting unit 30 impels the user to reentry or changes the bit rate into a recording bit rate value which satisfies the conditions. Thereafter, the parameter setting unit 30 sets the selected frame rate and the bit rate as initial parameter values in the coding/decoding unit 12 (step S120). In this case, the user selects and specifies the type of the image contents and the recording bit rate, but the user may input only a type of the image contents.

Figure 5:
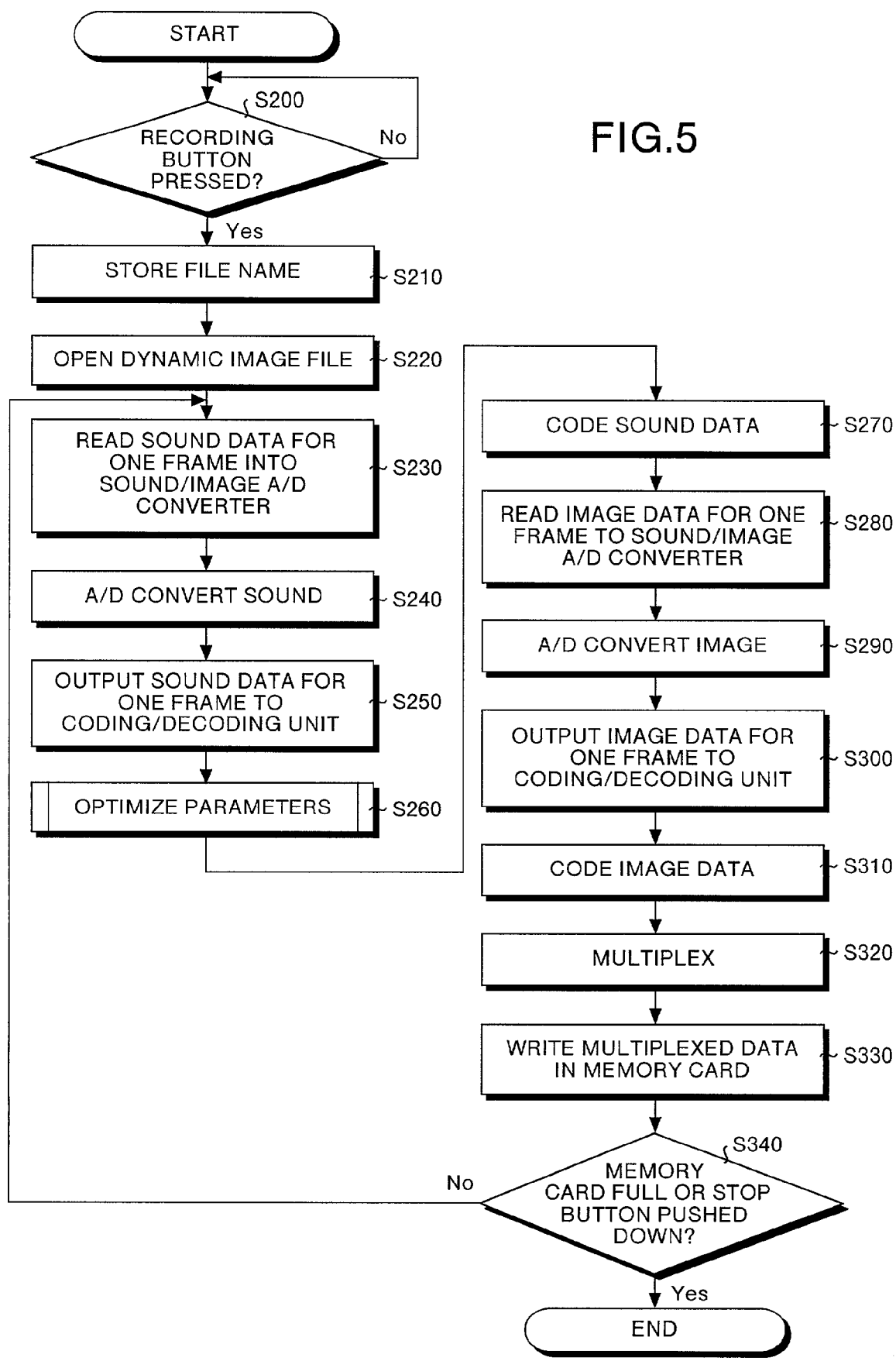
FIG. 5 is a flowchart showing a procedure at the time of recording.

FIG. 5 shows a flowchart of an entire operation of the portable video player at the time of recording. The user pushes a recording button included in the operation button 11 (step S200), the controller 20 creates a file name which is not included in the stored contents of the memory card 1 and stores the file name therein (step S210). The controller 20 secures an area in the memory card using the stored file name where a dynamic image file is stored (step S220).

Analog sound data for one frame which are input via the sound input terminal 6 are read into the sound/image A/D converter 8 (step S230). The sound/image A/D converter 8 converts the read analog sound dada for one frame into digital sound data for one frame (step S240). The sound/image A/D converter 8 inputs the digital sound data for one frame into the coding/decoding unit 12 (step S250)

Figure 6:
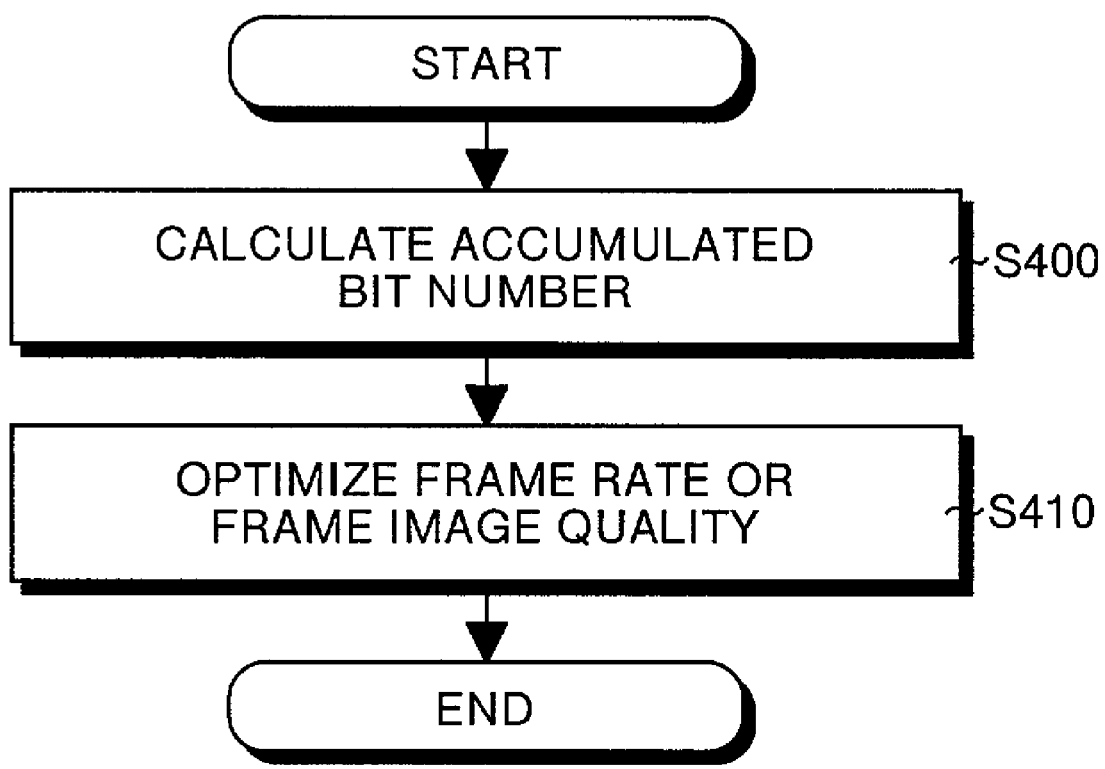
FIG. 6 is a flowchart showing a procedure for keeping the bit rate constant.

The parameter setting unit 30 in the controller 20 executes the process for optimizing parameters to be set in the coding/decoding unit 12 according to the current state (step S260). FIG. 6 shows the procedure of the parameter optimizing process. Firstly the parameter setting unit 30 calculates a number of accumulated coding bits at the actual time (step S400). The accumulated bit number which is externally calculated is divided by elapsed time from the starting of coding so that a current bit rate is calculated. When the calculated bit rate is larger than the previously set target bit rate, the frame rate is lowered or the frame image quality is improved so that the bit rate is lowered accordingly. Moreover, when the calculated bit rate is smaller than the target bit rate, the frame rate is lowered or the frame image quality is lowered so that the frame rate is raised accordingly. However, the increase/decrease in the frame rate and the inter-frame image quality is selected so that they fall within the optimal frame rate range or the optimal frame image quality range shown in FIG. 3 set in the database 40. In such a manner the frame image quality and the frame rate are optimized so that the whole bit rate is kept constant (step S410).

The process at step S260 of FIG. 5 is executed for every frame so that the optimizing process is executed for each one frame. Here, one frame is occasionally divided into a plurality of areas so as to be coded depending on certain coding system. In such a coding system, all the plural divided areas are subject to the optimizing process in frame unit.

When the optimizing process is completed, the coding/decoding unit 12 codes the digital sound data for one frame which are input according to the set parameter values (step S270). Next, an analog image data for one frame are read into the sound/image A/D converter 8 via the image input terminal 5 (step S280). The sound/image A/D converter 8 converts the read analog image data for one frame into digital image data for one frame (step S290). Next, the sound/image A/D converter 8 inputs the digital image data for one frame into the coding/decoding unit 12 (step S300).

The coding/decoding unit 12 codes the digital image data for one frame which are input according to the set parameter values (step S310). Further, the coding/decoding unit 12 multiplexes the coded sound data and the coded image data for one frame (step S320). The coding/decoding unit 12 transmits the multiplexed data for one frame to the controller 20. The controller 20 writes the multiplexed one frame data into the storage area of the file name previously stored in the memory card 1 (step S330). The process from steps S230 through S330 is executed repeatedly for every frame until a stop button included in the operation button 11 is pressed or the capacity of the memory card 1 runs short (step S340).

Figure 7:
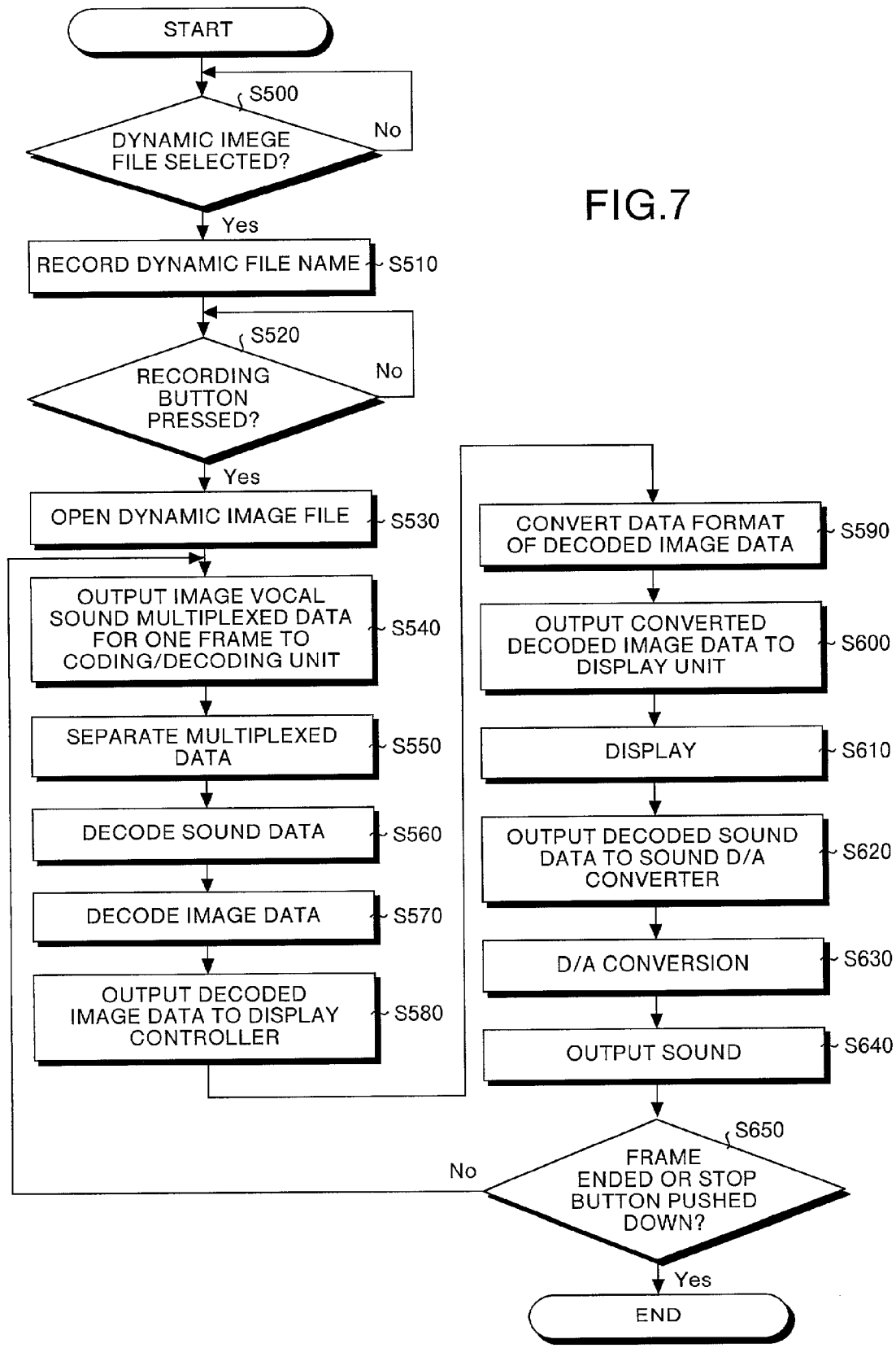
FIG. 7 is a flowchart showing a procedure at the time of reproduction.

An operation at the time of reproduction by the portable video player will be explained with reference to the flowchart of FIG. 7.

The user selects a desired dynamic image file in the memory card 1 using the operation button 11 (step S500). Upon the selecting operation, the controller 20 stores the name of the selected dynamic image file (step S510). When the user pushes down a reproduction button of the operation button 11 (step S520), the controller 20 opens the dynamic image film in the memory card 1 which is previously selected (step S530). The controller 20 reads image sound multiplexed data for one frame from the selected file in the memory card 1 (step S530). The controller 20 transmits the image sound multiplexed data for one frame to the decoding/decoding unit 12 (step S540).

The decoding/decoding unit 12 separates the image sound multiplexed data into image data and sound data (step S550) The decoding/decoding unit 12 decodes the sound data (step S560). The decoding/decoding unit 12 decodes the image data (step S570).

The decoding/decoding unit 12 outputs the decoded image data to the display controller 10 (step S580). The display controller 10 converts the input decoded image data into data format matching with the display unit 9 (step S590). The display controller 10 transmits the decoded image data to the display unit 9 (step S600). The display unit 9 displays the input decoded image data (step S610).

Next, the decoding/decoding unit 12 outputs the digital decoded sound data to the sound D/A converter 7 (step S620). The sound D/A converter 7 converts the decoded sound data into analog sound data and outputs it to the speaker 3 (step S630). As a result, the analog sound data are output from the speaker 3 (step S640). The process at steps S540 through S640 is executed repeatedly for each frame until the stop button included in the operation button 11 is pressed or the output from the selected file in the memory card 1 is ended (step S650).

In the present embodiment, the parameter setting unit 30 sets the frame rate and bit rate which are average ones at the time of coding in the optimal ranges according to selected image contents, image size and image resolution. As a result, at the time of coding, the frame rate or the frame image quality is changed dynamically so that the whole bit rate is kept constant. For this reason, even in the case a type of image contents, the image size and the image resolution change, an image with optimal image quality can be always provided to a user. Moreover, dynamic image sound data with small information amount can be recorded efficiently into the memory card. Further, the bit rate can be always kept constant.

In the present embodiment, the database, in which the optimizing ranges of the frame rate range, the bit rate range and the frame image quality range of coding by the coding/decoding unit 12 are previously set and stored according to a type of image contents, image size and image resolution, is created. However, a database, in which the optimizing ranges of the frame rate range and the bit rate range of coding are previously set and stored according to only a type of image contents, may be created, and the frame rate and bit rate may be variably set based on this database. Similarly, a database, in which the optimizing ranges of the frame rate range and the bit rate range of coding are previously set and stored according to only an image size, may be created, and the frame rate and the bit rate may be variably set based on this database. Furthermore, a database, in which the optimizing ranges of the frame rate range and the bit rate range of coding are previously set and stored according to only an image resolution, may be created, and the frame rate and the bit rate may be variably set based on this database. Namely, in the parameter setting unit 30, the frame rate and the bit rate of coding may be variably set according to a type of image contents, or according to an image size or according to an image resolution.

In addition, in the present embodiment, coding/decoding of sound data and coding/decoding of image data are carried out serially. However, a coding/decoding unit only for sound data and a coding/decoding unit only for image data are separately provided so that coding/decoding of sound data and coding/decoding of image data may be carried out in parallel.

Further, in the present embodiment, the memory card is adopted as small recording media, but a small (about 2 inches and not more than 3 cm) magneto-optical disc with low capacity (about 500 MB to 2 GB) (for example, data play) may be adopted as small recording media. Moreover, a small storage medium with low capacity having another recording format may be adopted.

As explained above, according to the present invention, since the frame rate and bit rate of coding are variably set according to types of image contents such as news, baseball broadcasting and drama, even in the case where a type of image contents changes, an image with optimal image quality can be always provided to a user. Moreover, dynamic image and sound data can be recorded with small information amount efficiently in a small-sized recording medium.

According to one aspect of the present invention, since the frame rate and the bit rate of coding are variably set according to an image size, even in an image size changes, an image with optimal image quality can be always provided to a user. Moreover, dynamic image sound data can be recorded with small information amount efficiently in a small-sized recording medium.

According to another aspect of the present invention, since the frame rate and the bit rate of coding are variably set according to an image resolution, even in the case where an image resolution changes, an image with optimal image quality can be always provided to a user. Moreover, dynamic image sound data can be recorded with small information amount efficiently in a small-sized recording medium.

According to still another aspect of the present invention, the frame rate or the frame image quality of coding is set variably and dynamically within predetermined frame rate range and frame image quality range so that a current bit rate maintains a target bit rate. For this reason, the bit rate can be kept constant, and as a result an image with optimal image quality can be always provided to a user. Moreover, dynamic image sound data can be recorded with small information amount efficiently in a small-sized recording medium.

According to still another aspect of the present invention, average frame rate and bit rate at the time of coding are set within optimal ranges according to selected image contents, image size and image resolution by first parameter setting unit. Whole bit rate is kept constant by second parameter setting unit. For this reason, the frame rate or the frame image quality are allowed to fluctuate dynamically at the time of coding. As a result, even in the case where a type of image contents, image size and image resolution change, an image with optimal image quality can be always provided to a user. Moreover, dynamic image sound data can be recorded with small information amount efficiently in a small-sized recording medium. Further, the bit rate can be always kept constant.

Moreover, the frame rate or the frame image quality is set dynamically and variably for every frame so that the whole bit rate is kept constant. For this reason, the whole bit rate can be kept constant efficiently by the process for each frame.

Furthermore, since storage contents of a database are set based on an inspection result of user monitoring, the voice of a user is truly reflected, and an image with optimal image quality can be provided to a user.

Moreover, after sound and image data, which are stored in a small-sized recording medium by coding via coding unit, are read and decoded, the data can be reproduced. For this reason, a dynamic image with optimal image quality can be always reproduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A portable image recording apparatus comprising:
   a coding unit which codes an input sound and image data relating to an image;
   a parameter setting unit which variably sets a frame rate and a bit rate of coding to be executed by the coding unit according to an input type of contents of the image and predetermined conditions; and
   a recording unit which records the coded data obtained by the coding unit into a small-sized recording medium.

2. A portable image recording apparatus comprising:
   a coding unit which codes input sound and image data relating to an image;
   a parameter setting unit which variably sets a frame rate and a bit rate of coding to be executed by the coding unit according to a resolution of the image based on input data and predetermined conditions; and
   a recording unit which records the coded data obtained by the coding unit into a small-sized recording medium.

3. A portable image recording apparatus comprising:
   a coding unit which codes input sound and image data relating to an image;
   a parameter setting unit which variably sets a frame rate and a bit rate or image quality of a frame of coding to be executed by the coding unit based upon an input image content type and based upon being within a predetermined range of the frame rate or a predetermined range of the image quality of the frame respectively so that a current bit rate maintains a target bit rate during the coding; and
   a recording unit which records the coded data obtained by the coding unit into a small-sized recording medium.

4. A portable image recording apparatus comprising:
   a coding unit which codes input sound and image data relating to an image;
   a database which previously stores therein optimal ranges of a frame rate, a bit rate, and a frame image quality of coding to be executed by the coding unit according to a content type, a size, and a resolution of the image;
   a first parameter setting unit a) which selects a frame rate and a bit rate which are optimal for an input selected image content type, b) which selects an image size, and an image resolution based on the contents of the database and c) which sets the selected frame rate and the bit rate in the coding unit as initial values;
   a second parameter setting unit which variably sets a frame rate or an image quality of a frame of coding to be executed by the coding unit within a predetermined range of the frame rate and a predetermined range of the frame image quality respectively so that a current bit rate maintains a target bit rate during coding; and
   a recording unit which records the coded data obtained by the coding unit into a small-sized recording medium.

5. The portable image recording apparatus according to claim 4, wherein the second parameter setting unit sets the frame rate and the frame image quality for every one frame.

6. The portable image recording apparatus according to claim 4, wherein the contents are stored in the database based on an inspection by users.

7. The portable image recording apparatus according to claim 4, further comprising:
   a decoding unit which reads and decodes the sound and image data stored in the small-sized recording medium; and
   a reproduction unit which reproduces the decoded sound and image data.

* * * * *